United States Patent [19]
Berteig et al.

[11] Patent Number: 5,986,657
[45] Date of Patent: *Nov. 16, 1999

[54] METHOD AND APPARATUS FOR INCORPORATING EXPANDABLE AND COLLAPSIBLE OPTIONS IN A GRAPHICAL USER INTERFACE

[75] Inventors: Rolf Walter Berteig, Seattle, Wash.; Daniel David Silva, San Rafael; Donald Lee Brittain, Santa Barbara, both of Calif.; Thomas Dene Hudson, Port Washington, Wis.; Gary S. Yost, San Francisco, Calif.

[73] Assignee: Autodesk, Inc., San Rafael, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/903,829

[22] Filed: Jul. 31, 1997

Related U.S. Application Data

[60] Provisional application No. 60/025,117, Aug. 2, 1996.

[51] Int. Cl.[6] ........................................................ G06F 3/14
[52] U.S. Cl. ............................ 345/357; 345/339; 345/352
[58] Field of Search .................................... 345/334, 339, 345/347, 348, 352, 353, 354, 356, 357

[56] References Cited

U.S. PATENT DOCUMENTS

| | | | |
|---|---|---|---|
| 5,345,550 | 9/1994 | Bloomfield | 345/353 |
| 5,485,175 | 1/1996 | Suzuki | 345/348 |
| 5,491,795 | 2/1996 | Beaudet et al. | 345/341 |
| 5,559,944 | 9/1996 | Ono | 345/353 |
| 5,588,107 | 12/1996 | Bowden et al. | 345/344 |
| 5,644,737 | 7/1997 | Tuniman et al. | 345/348 X |
| 5,659,693 | 8/1997 | Hansen et al. | 345/353 X |
| 5,801,703 | 9/1998 | Bowden et al. | 345/357 |

OTHER PUBLICATIONS

IBM Systems Application Architecture: Common User Access Advanced Interface Design Guide, pp. 167–179, Jun. 1996.

*Primary Examiner*—Raymond J. Bayerl
*Assistant Examiner*—Chadwick A. Jackson
*Attorney, Agent, or Firm*—McDermott, Will & Emery

[57] ABSTRACT

A graphical user interface ("GUI") incorporating one or more subpanels. Each subpanel has a presentation control and can have one or more GUI objects displayed on the computer screen. Each subpanel may be toggled between an expanded state or a collapsed state by operating the presentation control. Expanding and collapsing the subpanels changes the appearance and the functionality of the GUI, but the size of area of the screen used by the subpanels remains unchanged.

7 Claims, 9 Drawing Sheets

METHOD AND APPARATUS FOR INCORPORATING EXPANDABLE AND COLLAPSIBLE OPTIONS IN A GRAPHICAL USER INTERFACE

This application claims benefit of provisional application Ser. No. 60/025,117, filed Aug. 2, 1996.

BACKGROUND OF THE INVENTION

A. Field of the Invention

The field of the invention relates generally to a method and apparatus for displaying, selecting, and setting options as part of a graphical user interface for a computer program.

B. Description of the Related Art

Graphical user interfaces are commonly used by computer systems to enable computer operators to simply and effectively control the computers in those systems. A computer operator typically will manipulate a variety of graphical objects within such interfaces such as: desktops, windows, cursors, folders, files, icons, buttons, menus, control panels and dialog boxes, to accomplish a variety of tasks on the system. Such graphical user interfaces can play an important role in simplifying computer tasks so that they may be more easily understood and accomplished, even by unsophisticated users. Such graphical user interfaces may also provide improved control over the operation of the computer system and enable a user to easily accomplish tasks that might be difficult to accomplish with other types of interfaces.

A typical graphical user interface provides a display in which windows may be used to organize and show graphical user interface objects associated with application programs and documents, on a CRT or other display device. Graphical user interface objects that enable the user to accomplish the variety of tasks typically are also provided in the display. Generally a keyboard and a mouse, or similar pointing device, are provided with the computer system for selecting options and interacting with the objects in the graphical user interface. Typically, the mouse will have one or more buttons each of which cause the computer to respond in a programmed manner. A user manipulates the cursor on the display by moving the mouse. The cursor may be represented on the display by a wide variety of images such as a vertical bar, an arrow, a hand, a pencil, a can of paint, an eraser or any other desired symbol. The keyboard typically has keys, possibly in foreign languages or symbol sets, for data entry purposes along with other keys which the operating system or application programs can program to respond in various fashions. To interact with objects in the graphical user interface, the user uses the input devices to activate and work with graphical user interface objects. For example, to activate a graphical user interface button object, a user would move the mouse so that the cursor was over the graphical user interface button object and then activate the appropriate mouse button.

The advantages of graphical user interfaces may enhance the ability of application programs to provide users with desired functions or operations. Application programs can include programs such as word processors, spreadsheets, World Wide Web browsers and other Internet related software, finance software, personal information managers, graphics modeling and animation programs, or any of a wide variety of other programs. Using graphics modeling and animation programs as an example, graphical user interfaces may enhance the users ability to create and manipulate the images or scenes and to manipulate the objects being drawn, modeled or animated in an image or scene. The graphical user interface for an application program is typically implemented as a menu bar, a tool bar, a floating tool pad, or a combination of the three.

A menu bar is typically comprised of menus indicated by keywords, sometimes paired with images, arranged along the top, sides or the bottom of the display or each window. By pointing the cursor at a menu in a menu bar and activating a mouse button, the menu expands toward the center of the screen to reveal one or more choices, typically the choices are represented by keywords. Some of the choices may be commands or functions, while others may activate sub-menus. The sub-menus typically appear alongside the menu with the first item of the sub-menu lined up with the choice from the original menu that opened the sub-menu. A sub-menu may itself contain keywords that open sub-sub-menus, and so on. This hierarchical and recursive organization of the menu provides a compact and intuitive format for presenting commands to the user. A well known example of a menu is the "Start" button in the Windows 95™ operating system. The main disadvantage of a menu is that the user may have to traverse multiple levels of the hierarchy to activate a command. Although the hierarchy assists the user in remembering the command, the traversal to the command itself may require several mouse movements and activations for each access to the command which slows the user down.

The tool bar or tool pad typically is comprised of several icons, drawn to resemble buttons on the screen, arranged linearly (tool bar) or in a square or rectangular matrix (tool pad). The user activates the commands represented by the buttons on a tool bar by pointing the cursor at the button and activating a mouse button. Each button on a tool bar activates a particular function. The main advantage of a tool bar is speed and convenience. The functions on a tool bar may be activated by pressing a single mouse button without the necessity to traverse the hierarchy of a menu. The disadvantage of a tool bar is that because of its flat organization, it grows in size very rapidly as buttons are added. Tool bars are typically not hierarchical like menus. The typical approach to adding hierarchy to Tool bars is to include controls in a tool bar that when activated, will place another tool bar on the screen adjacent to the first tool bar. When the original control is selected again, the second tool bar is removed from the screen. With each tool bar that is added, albeit temporarily, limited display space is used up and the user is relegated to a smaller area for viewing results. Since the size of the CRT or other display device is limited, as a tool bar grows in size it obscures other parts of the display, including the portion of the display used to show the user the result of the commands, such as the document display area in a word processing program or the view ports displaying the 3D objects being created and modified by the user of a graphics modeling program. Most programs therefore strike a compromise by providing both menus and Tool bars and permitting the user to customize the tool bar and to move the tool bar to different portions of the screen. When tool pads are used, they are typically programmed as "floaters" and may be moved around and placed anywhere on the screen by the user while the program is in use. As the sophistication and complexity of computer programs increase, more and more screen space must be devoted to Tool bars, tool pads, and similar features to accommodate the additional functionality of the programs. If the hierarchical compactness of a menu could be provided in a tool bar, thus permitting the tool bar to expand without using up additional space on the screen, the growing number of functions of sophisticated computer programs could be displayed in a convenient format for the user, while minimizing the screen space utilized to accommodate the functions.

Accordingly, what is needed is a method and apparatus to provide a more compact presentation of groups of functions contained entirely within a single element of the graphical user interface.

SUMMARY OF THE INVENTION

An improved graphical user interface ("GUI") incorporating one or more subpanels. Each subpanel has a presentation control and can have one or more GUI objects displayed on the computer screen. Each subpanel may be toggled between an expanded state or a collapsed state by operating the presentation control. Expanding and collapsing the subpanels changes the appearance and the functionality of the GUI, but the size of area of the screen used by the subpanels remains unchanged.

BRIEF DESCRIPTION OF THE DRAWINGS

These and other features and advantages of the invention will become more apparent to those skilled in the art from the following detailed description in conjunction with the appended drawings in which.

DETAILED DESCRIPTION OF THE PREFERRED EMBODIMENT

A. Overview

Figure 1:
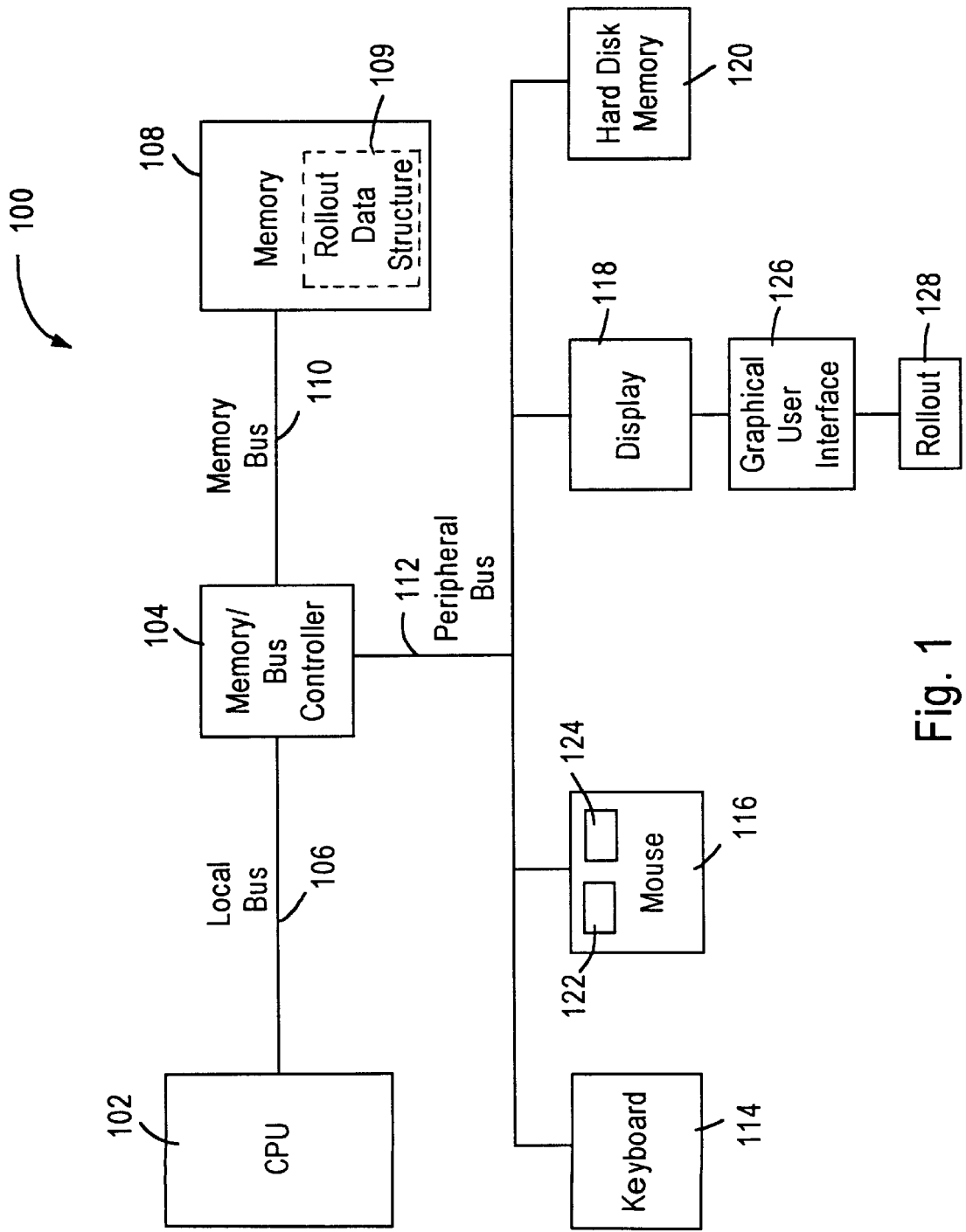
FIG. 1 is a block diagram of a computer system having a graphical user interface containing a "Rollout" wherein the Rollout is an embodiment of the invention.

Embodiments of the invention provide novel methods and apparatus for providing hierarchical grouping of functions as subpanels in a tool bar. Descriptions of specific applications are provided only as examples. Various modifications to the described embodiments may be apparent and the generic principles defined herein may be applied to other embodiments and applications without departing from the spirit and scope of the invention. Thus, the invention is not intended to be limited to the described or illustrated embodiments, but is to be accorded the widest scope consistent with the principles and features disclosed herein.

One aspect of one embodiment of the invention is the addition of expandable and collapsible subpanels to a tool bar or a tool pad or other graphical user interface object. Each subpanel has a presentation control that is used to expand or collapse it. When expanded, the subpanel adds several related functions in the form of commands, icons, dialog boxes, check boxes and the like, to the tool bar, making the commands accessible to the user. When collapsed, the subpanel appears as a single presentation control. Whether expanded or collapsed, the embodiment is contained entirely within a region of the screen in which it is displayed and the screen space occupied by the region remains substantially constant irrespective of whether the subpanels in the region are expanded or collapsed.

Table 1, below, summarizes a portion of the user's guide for 3D Studio MAX™ (3D Studio Max User's Guide, Volume 1, Chapter 2, pages 12–13 (March 1996) (images and captions omitted)).

TABLE 1

Rollouts are areas in the command panels and dialogs that you can collapse (roll in) or expand (roll out) in order to manage screen space and make the display more readable.
• When a rollout is expanded, its controls appear within a border and a minus sign (–) appears in the left side of the title bar. Click the title bar to collapse the rollout.
• When a rollout is collapsed, a plus sign (+) appears in the left side of the title bar. Click the title bar to expand the rollout.
Sometimes a command panel or dialog is not large enough to display all rollouts at once. In this case, a panning hand appears over the non-active parts of the rollout. You can still use controls such as buttons-the hand changes to a regular arrow cursor when you move over any control.
   To drag rollouts up or down:
      1. Position the cursor over an empty area of a rollout.
      2. Drag up or down.
   a thin scroll bar also appears on the right side of the rollout indicating whether you are viewing the top or bottom of the rollout. You can use the hand to drag the scroll bar as well.

One implementation of the invention groups various functions used in connection with creating and editing three-dimensional scenes in a graphical design package. When the subpanel is collapsed, minimizing space, the user may select a function contained in the subpanel by activating the presentation control that represents the subpanel on the tool bar. The expansion of the subpanels places the controls grouped in the subpanel on the tool bar. The user can then activate any of the controls in the same manner as activating any other control on the tool bar. When the user no longer needs the group of commands contained in the subpanel, the user activates the same mouse button used by the user to expands the subpanel, and the subpanel collapses, leaving only a presentation control on the tool bar.

B. Computer System

Referring now to FIG. 1, there is shown a simplified block diagram illustrating an example of a general purpose programmable computer system 100 on which an embodiment of the invention is being used. In particular, system 100 includes a central processing unit (CPU) 102 for executing instructions and performing calculations, a memory/bus controller 104 coupled to the CPU 102 by a local bus 106, a memory 108 for storing data and instructions coupled to the memory/bus controller 104 by memory bus 110, a peripheral bus 112 coupled to the memory/bus controller 104, and Input/Output (I/O) devices 114–120 coupled to the peripheral bus 112. The various buses of this system 100 provide for communication among system components in a manner known in the art. The I/O devices 114–120 in system 100 include a keyboard 114, a mouse 116 or other control device, a CRT 118 or other display device and a hard disk memory 120 or other non-volatile storage device for storage of data and programs. In system 100, the mouse has mouse buttons 122 and 124. System 100 is running software that provides a graphical user interface 126. The graphical user interface includes what shall be referred to herein as a "rollout" 128 in accordance with one embodiment of the invention.

Embodiments of the invention may be used with commercially available computer systems such as IBM or Apple Macintosh compatible personal computers or with workstations from Silicon Graphics or Sun. Embodiments of the invention are not limited to use on any of these systems, however. In fact, embodiments of the invention are not limited to use with computer systems presently known in the art.

C. User Interface System

Figure 2:
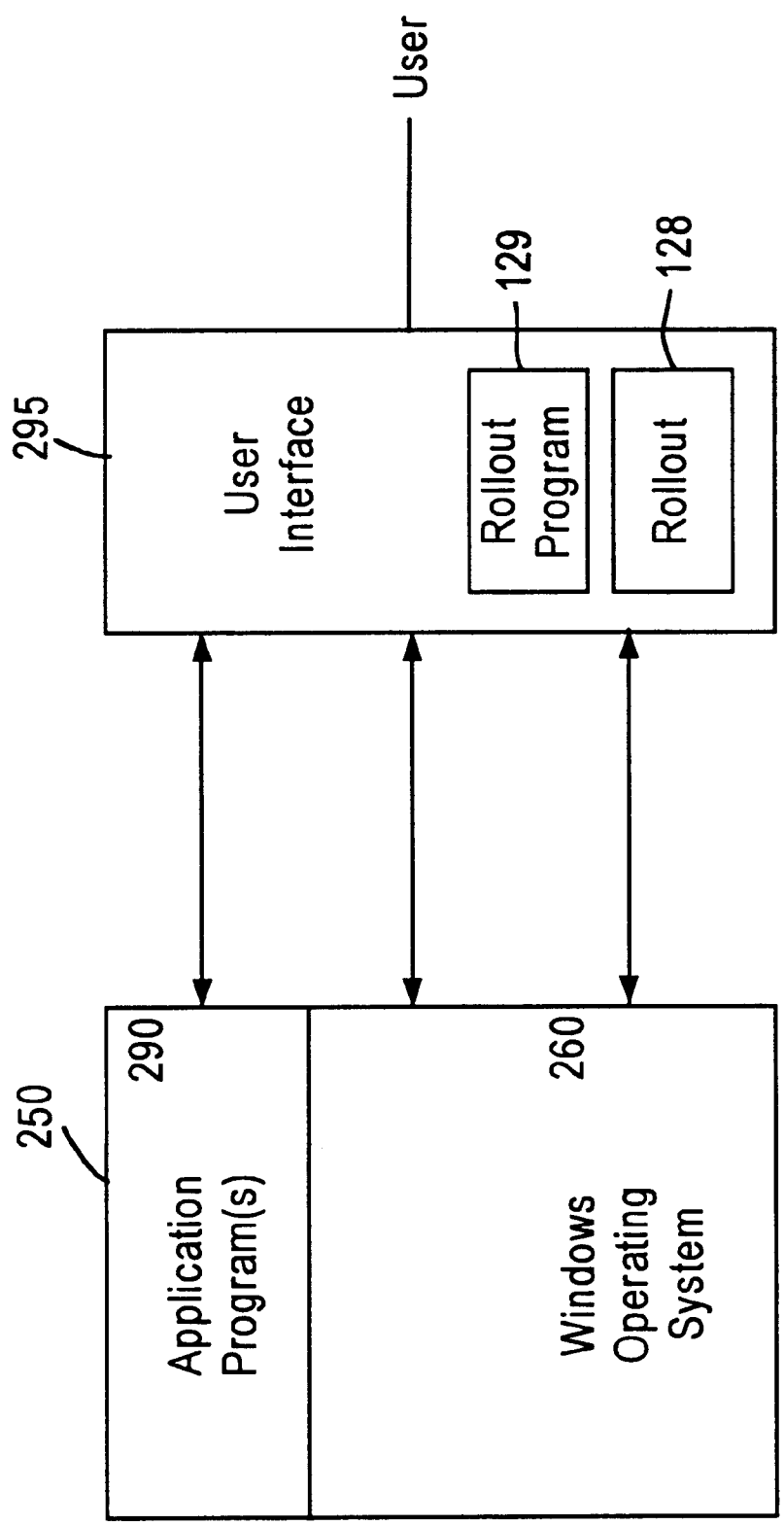
FIG. 2 is a block diagram of software for controlling the operation of the computer system of FIG. 1, including a user interface that includes a Rollout embodiment of the invention.

FIG. 2 illustrates the relationship between the software 250 and a user interface 295 that may be used by and run on a computer system such as system 100. FIG. 2 illustrate a Microsoft Windows™ operating system 260. Of course, a wide variety of operating systems might be used, including, for instance, the Apple Macintosh™ operating system or UNIX. Application program(s) 290 that may run on such a system may include word processors, spreadsheets, or graphics modeling or animation programs or any of a wide variety of other types of application programs. Software 250 provides routines to interface with the user interface 295. The software 250 may be stored in memory 108 and/or on hard disk 120 and may be transferred between memory devices when it is executed. The user communicates with the computer system 100 through the user interface 295.

Referring to FIGS. 1 and 2, the user interface 295 includes the keyboard 114, the mouse 116 or other control device, the CRT 118 or other display device (e.g. LCD display), the graphical user interface 126 and rollout 128 displayed on the CRT 118. As used in this application, a "rollout" is a control in a graphical user interface that can be collapsed and expanded within an object of the graphical user interface. In this context, an object in a graphical user interface is a control such as a menu, a tool bar or tool pad. Although this embodiment of the invention is shown in connection with a tool bar, the invention is not limited to use within a tool bar. Other elements of a graphical user interface may also support the invention. When expanded, a rollout 999 appears as a subpanel contained within the object in which it appears, the subpanel containing one or more controls such as buttons, dialog boxes, "spinners" (described below), check boxes and the like as well as the presentation control 999 for the subpanel. When collapsed, the rollout 999 appears as a single control, namely the presentation control 999, on the object of the graphical user interface in which it appears. Whether collapsed or expanded, a rollout 999 is contained entirely within the element of the graphical user interface in which the rollout appears in this embodiment. The graphical user interface object containing the rollout 999 uses up substantially the same amount of screen space to display its controls whether the rollout 999 is expanded or collapsed.

The rollout 999 is stored as a data structure 109 within memory 108. The data structure 109 stores the information required to draw the rollout 999, the rollout subpanel 999 and the rollout controls 999 as part of an element of the application program or the operating system. The data structure further stores information about whether the rollout subpanels 999 are expanded or collapsed and the routines or objects 129 that are activated when the rollout 999 or a control located on the rollout subpanel 999 is activated or manipulated by the user as part of the user interface 295. Details of the implementation of such a data structure will be readily appreciated by persons of ordinary skill in the art and will, therefore, not be described herein.

The interface 295 provides a mechanism by which the user can control the computer system and/or manipulate graphical objects in the graphical user interface (GUI) 126.

D. Graphical User Interface Details

Figure 3:
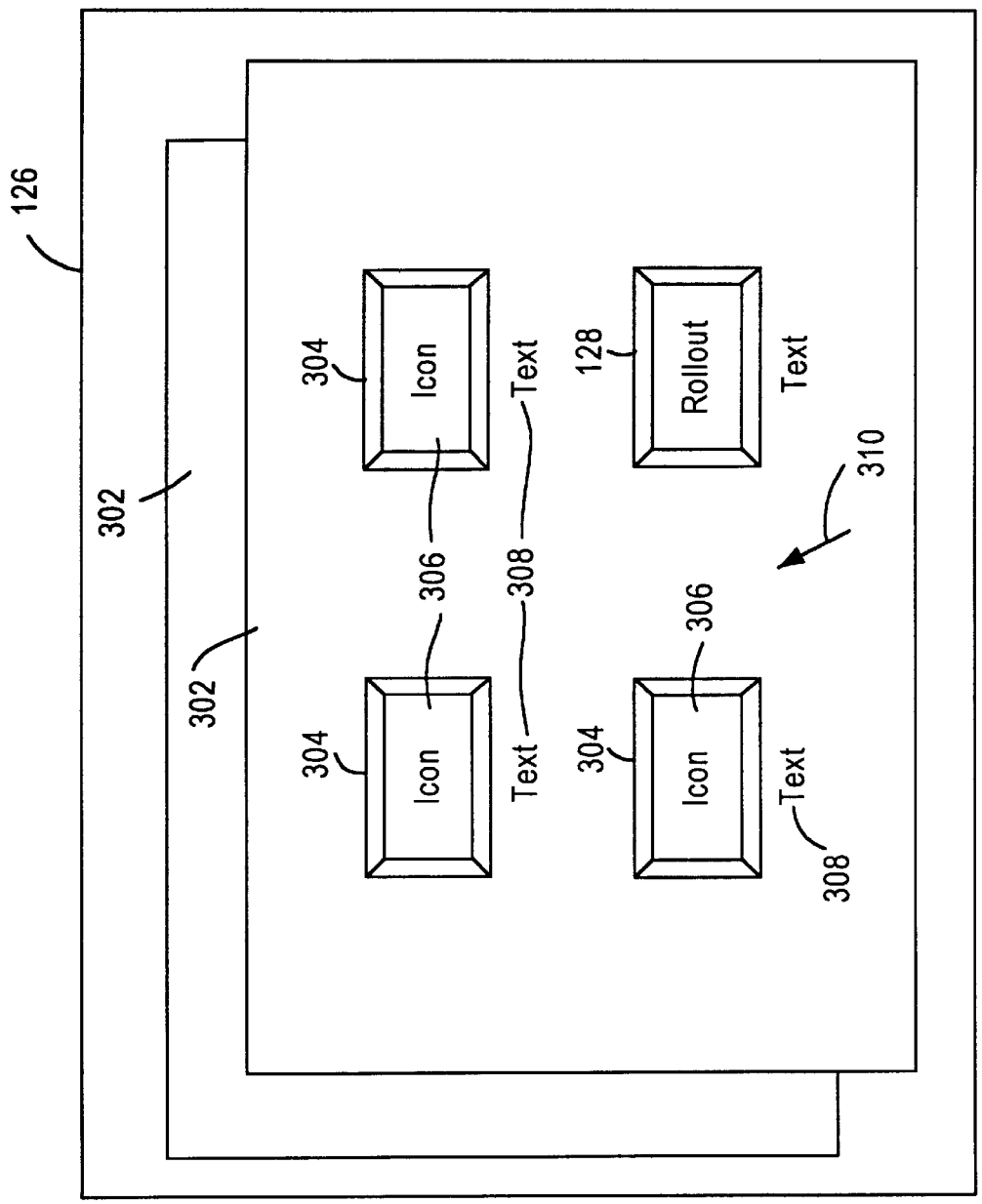
FIG. 3 is an expanded view of the graphical user interface of FIG. 1.

FIG. 3 is an expanded view of a graphical user interface 126. In particular, FIG. 3 illustrates graphical objects such as windows 302, buttons 304 or icons 306, cursor 310 and a rollout 128. As shown in GUI 126 in FIG. 3, text 308 may be associated with graphical user interface objects.

Underlying the graphical user interface 126 is a software architecture that enables the user to interact with the computer system and causes the computer system to respond to input the user provides using the user interface, including the graphical user interface. This underlying architecture enables the user to control the position of a cursor, for example, by moving a mouse 116. It causes the computer to open a document, for example, when the user selects using a mouse a graphical representation of the document in the GUI 126 and selects "open" from a menu. This underlying architecture may be of a type presently known in the art (e.g event driven architecture), but is not limited to presently known architectures. The architecture of this embodiment, is programmed as explained in the flow diagram of FIG. 5 to implement the rollouts described herein. In this embodiment, when the rollout 999 is expanded, the rollout subpanel 999 displays controls consistent with the software architecture of the graphical user interface 126, thus the underlying software architecture of the embodiment includes computer programs used to implement rollouts 999 as part of the GUI 126. Details of the implementation of such computer programs will be apparent from the following description and will be readily appreciated by persons of ordinary skill in the art and, therefore will not be described herein.

E. Rollouts

FIGS. 4A–D illustrates a view of the computer display screen that displays a graphical user interface 126 that includes embodiments of the invention. In particular, these figures illustrate a graphical user interface 400 for modeling and animation software. Similar software, called 3D Studio MAX™, is available from AutoDesk, Inc. of San Rafael, Calif.

Embodiments of the invention are not limited to use with modeling or animation software, however. In addition, embodiments of the invention are not limited to use with application programs. Embodiments of the invention might be used with other types of application programs, in system software or in other types of software, for example.

Figure 4A:
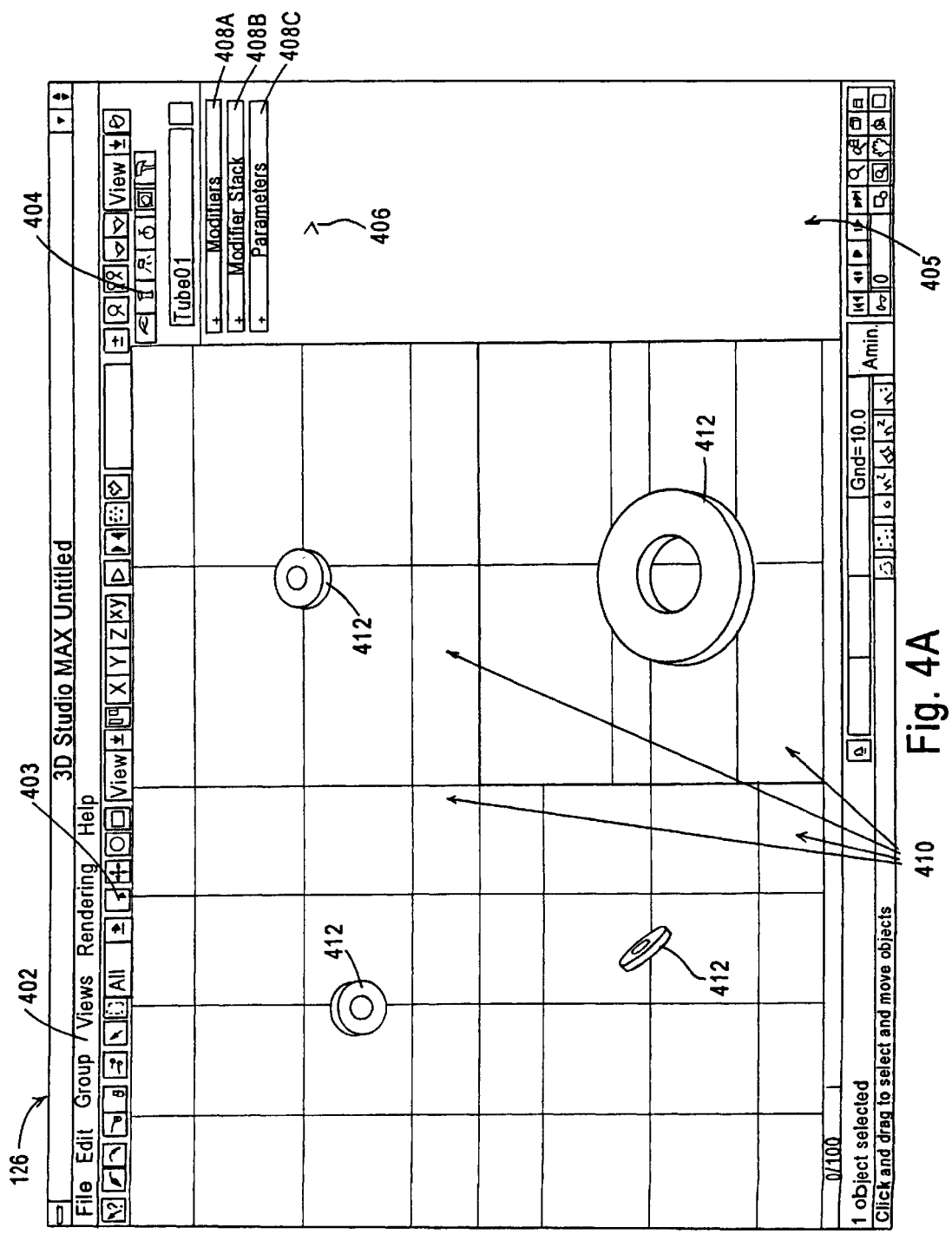
FIGS. 4A, 4B, 4C, 4D and 4E are screen shots providing an example of how a Rollout embodiment of the invention may be used in conjunction with a tool bar.

As shown in FIG. 4A, this graphical user interface 126 includes a menu bar 402, a tool bar 403, a command panel bar 404, a command panel 405, cursor 406, rollouts 408 and view ports 410. Through this graphical user interface, a user can instruct the computer to use the modeling and animation software to perform a variety of graphics related tasks. For example, the user may instruct the computer to create a graphical object, such as cylinder 412, in view ports 410. For a more complete description of an example of graphics and modeling software, please see 3D Studio Max User's Guide, Volumes 1 and 2 (March 1996) and 3D Studio Max Tutorials (March 1996) available from AutoDesk, Inc. of San Rafael Calif. These documents are hereby incorporated herein by this reference.

Figure 4B:
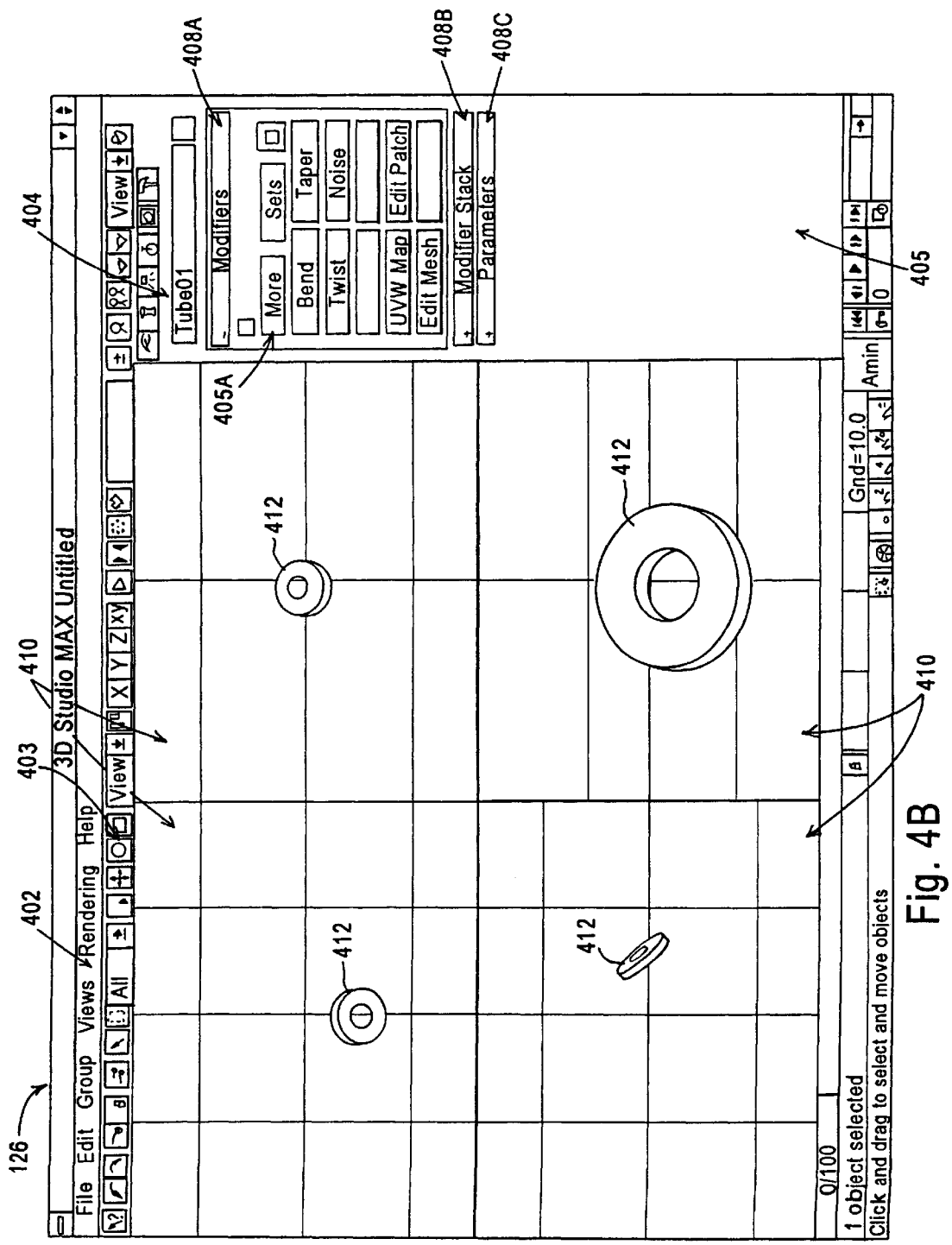
Figure 4C:
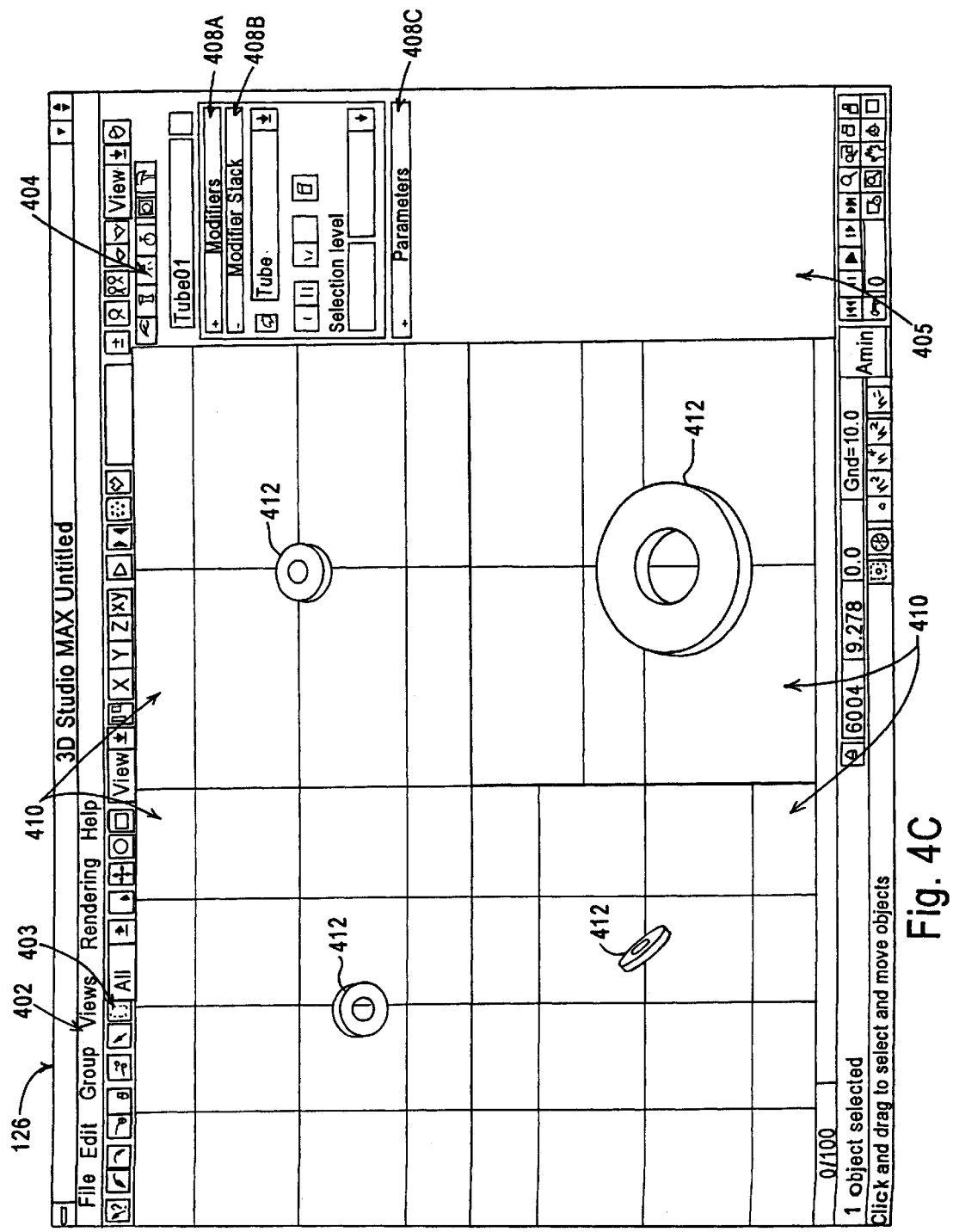
Figure 4D:
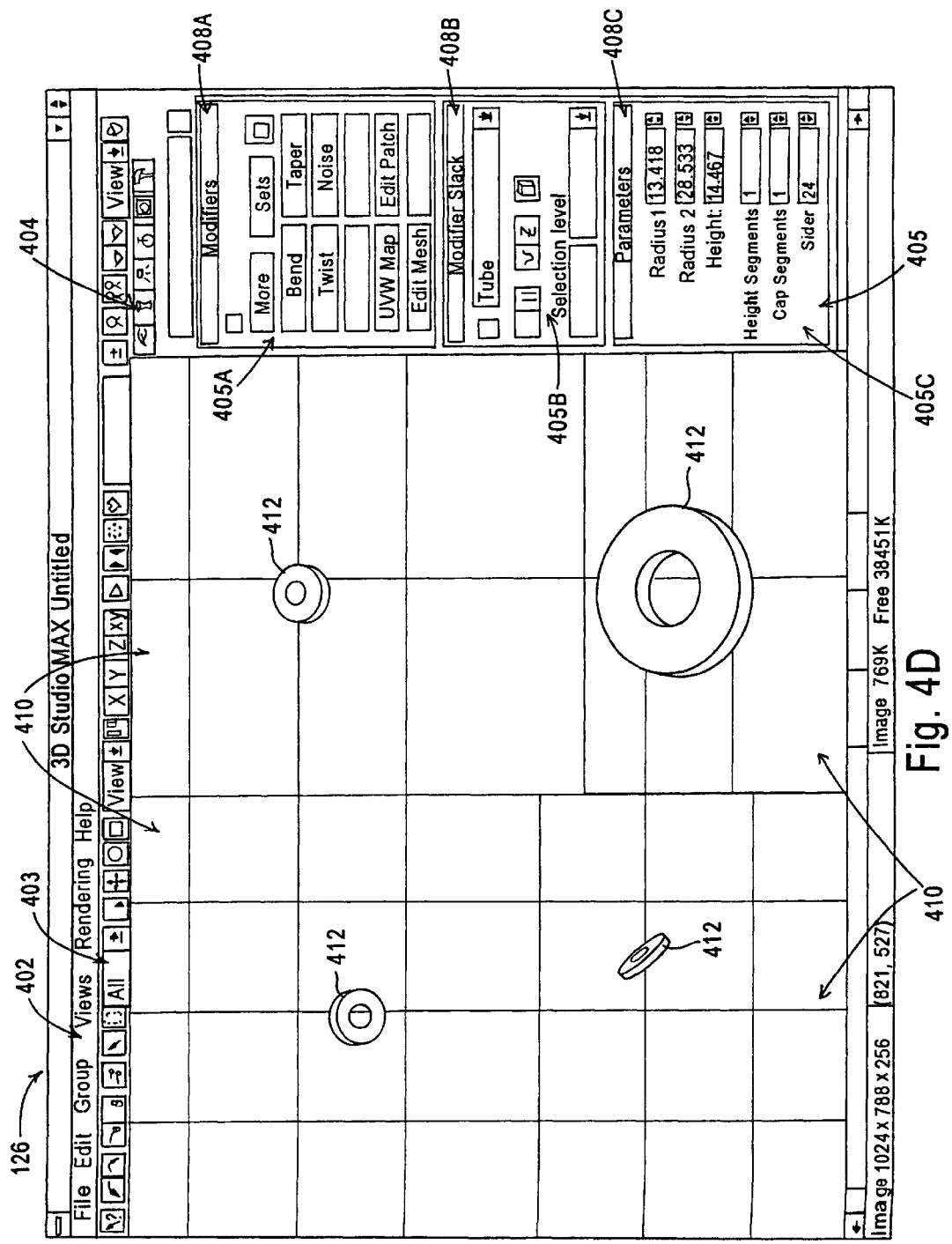
Figure 4E:
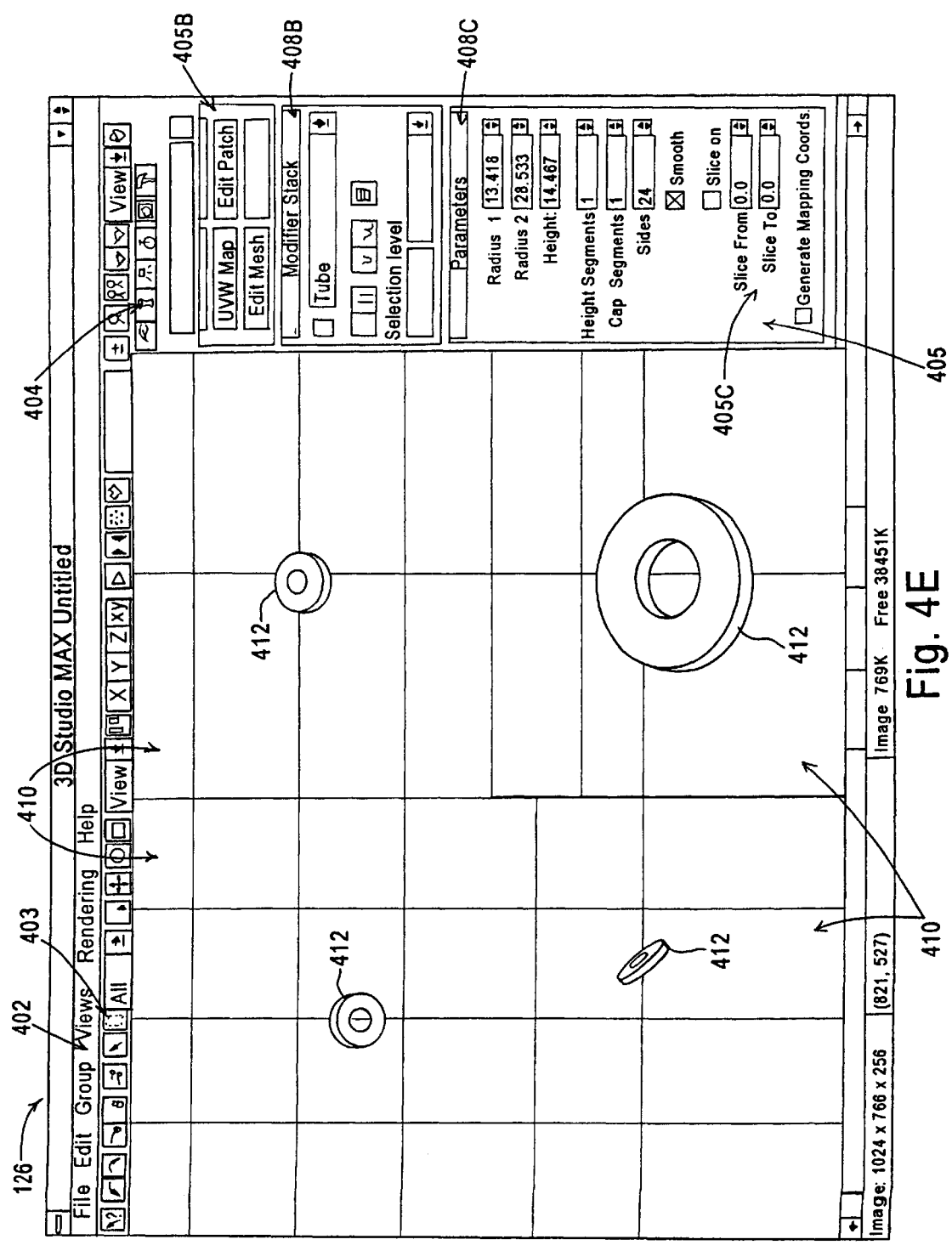

In FIG. 4A, command panel 405 is an example of a GUI element that contains rollouts 408 (i.e. 408A, 408B and 408C) which are embodiments of the invention. The rollouts in FIG. 4A are collapsed and therefore each appears as a presentation control 999 on the command panel 405. FIG. 4B shows rollout 408B in its expanded state. As can be seen from the screen shot, the expansion of rollout 408A exposed subpanel 405A which contains several controls, including buttons and a check box. With the rollout expanded, the subpanel controls are placed on the control panel 405 and appear to be part of the control panel itself FIG. 4C illustrates command panel 405 with rollout 408A collapsed, thus appearing as a presentation control 999, and rollout 408B expanded, thus adding several controls, including a list box, several radio buttons and a dialog box to the command panel 405. The controls exposed by expanding rollout 408B are contained on subpanel 405B. FIG. 4D is a screenshot showing al three rollouts 408A, 408B and 408C expanded. Subpanel 408C contains several controls which permit the designer to adjust parameters using "spinners". Spinners are described in a copending patent application entitled "Method and Apparatus for Control of a Parameter Value Using a Graphical User Interface", inventors: Rolf Walter Berteig, Daniel David Silva, Donald Lee Brittain, Thomas Dene Hudson, and Gary S. Yost provisional application Ser. No. 60/025,117, filed on Aug. 2, 1996 which is incorporated into this application by this reference. Spinners may be used as a type of control located in a rollout. As illustrated, command panel 405 may be scrolled up or down by the user to gain access to the controls located beyond the field of the screen's display. FIG. 4E illustrates command panel 405 after being scrolled up by the user to expose the controls that were not visible due to the vertical limitation of the screen.

The use of rollouts as part of a command panel or tool bar assists the user by keeping the most often used commands on the screen and within easy access of the user at all times. The ability to collapse subpanels to minimize the use of space on the tool bar or command panel reduces the amount of space required on the screen to display the controls needed by the user to operate the system. Moreover, the use of the same control to expand and collapse a subpanel enhances the ease of use of the system by simplifying the users task of navigating through subpanels.

In a system such as the modeling and animation software illustrated in the screen shots in FIGS. 4A through 4E, the command panel may be scrolled up or down to permit the user access to controls that are off the screen. In such a system, the use of rollouts reduces the time spent by the user in scrolling the command panel looking for the appropriate control for the task at hand. By collapsing the rollouts whose controls are not in use, the total length of the command panel is reduced, and the controls on the collapsed subpanel are available for use by expanding the rollout at any time. While this embodiment illustrates rollouts as a part of a command panel, they may be used in other contexts.

F. Method Description

Figure 5:
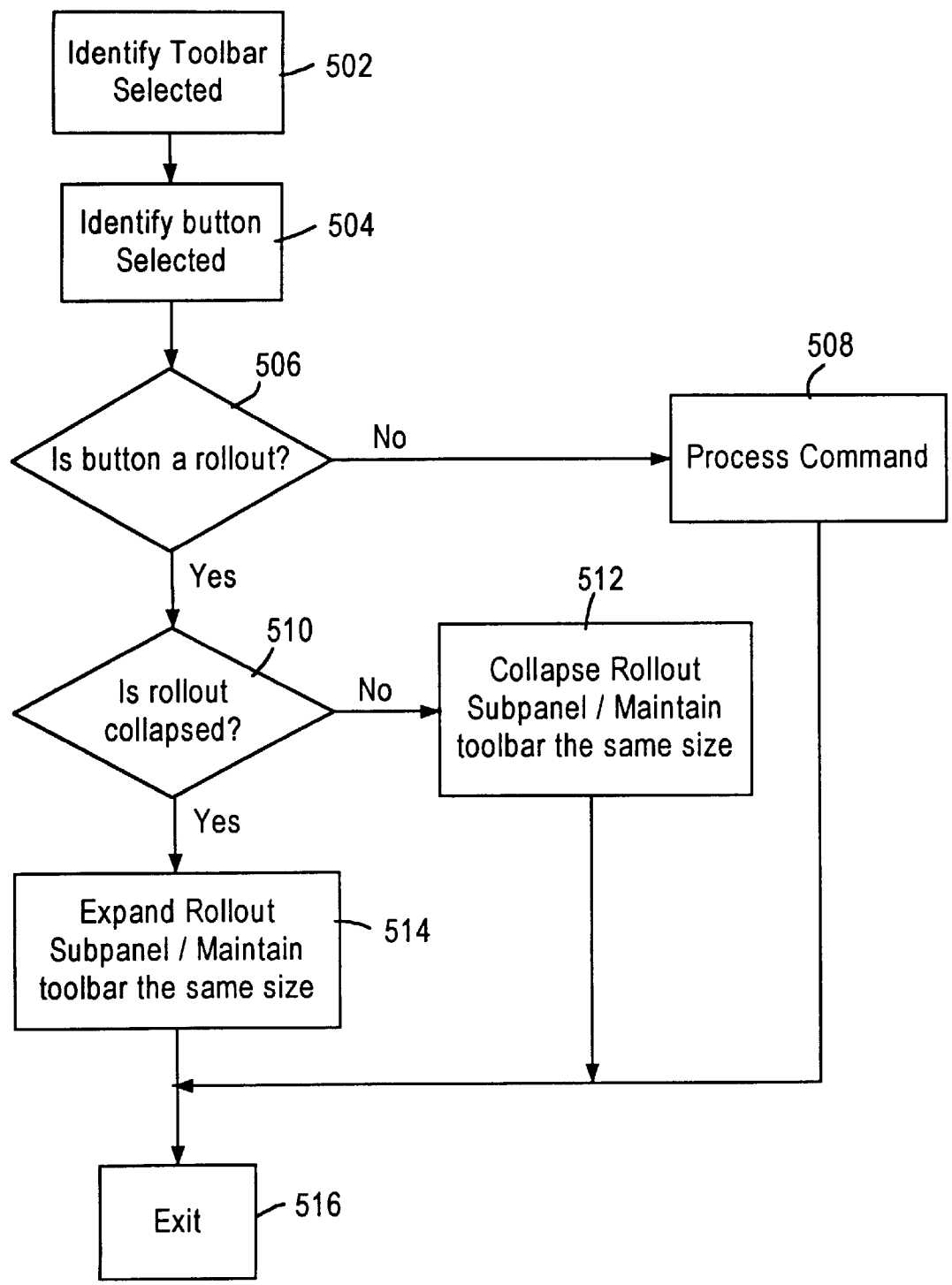
FIG. 5 illustrates a flow chart describing the operation of one embodiment of the invention.

FIG. 5 contains flow chart 500 illustrating the functions of the rollouts 408 illustrated in FIGS. 4A–4E.

In an embodiment of this invention, the process of flowchart 500 is implemented by the computer programs integrated into the software architecture of the user interface 295. When the user selects a command from the program's user interface, for example by pointing a cursor at a tool bar button and activating the mouse button, the user interface 295 identifies, in step 502, which tool bar was selected by the user and further identifies in step 504 which button on the tool bar was selected by the user. In step 506 the user interface determines, by reference to a data structure stored in memory 108 whether the button selected is a rollout or a command. If the button selected by the user is not a rollout, in step 508, control is passed to the appropriate routines in the system to process the command selected by the user. Upon return from those routines, control is passed to step 515 and this process terminates.

If the button selected by the user is determined to be a rollout, the status of the rollout is checked in step 510 by reference to a data structure stored for this purpose in memory 108. If the rollout is collapsed, meaning that it is represented on the tool bar by a presentation control 999 and that the functions programmed into the subpanel of the rollout are not visible, the rollout is expanded in step 514. The expansion of the rollout causes the rollout's subpanel to be added to the tool bar and the controls which are programmed as part of the rollout to be displayed within the tool bar. The control is then passed to step 516 and this process terminates.

If in step 510 it is determined that the rollout is expanded, meaning that the rollout's subpanel is visible and the controls which are programmed to be part of the rollout are visible within the rollout subpanel, the rollout is collapsed in step 512. Collapsing the rollout removes the rollout subpanel and all the rollout's controls from the tool bar. When collapsed, the rollout appears as a presentation control 999 on the tool bar.

While the invention is described in terms of what is presently considered to be the preferred embodiment, the invention is not limited to or by the disclosed embodiment. The person of ordinary skill will readily appreciate that the Applicant's inventions can be applied beyond the particular systems mentioned as examples in this specification. The invention comprises all embodiments within the scope of the appended claims and/or supported by the disclosure.

What is claimed is:

1. A graphical user interface ("GUI") operating in a computer system, the GUI having a plurality of controls, the computer system including a display device coupled to a memory, and executing a program, the GUI interacting with a program, the GUI comprising:

a display region within a window of the GUI that includes one or more subpanels, each subpanel having a presentation control bearing a name of its associated subpanel and one or more GUI objects appearing thereon when expanded and having only the presentation control with the name of the associated subpanel appearing thereon when collapsed;

a program interacting with the GUI and implemented in the memory to collapse a selected subpanel of the one or more subpanels when the presentation control of the selected subpanel is activated and when the selected subpanel is expanded, and to expand the selected subpanel when the presentation control of the selected subpanel is activated and when the selected subpanel is collapsed, and to further maintain the length and width of the display region substantially unchanged and without scroll bars and a position of the presentation control substantially unchanged when any of the one or more subpanels are expanded or collapsed; and a scrolling mechanism for scrolling said one or more panels in said display region in a particular direction by dragging an inactive portion of said display region other than a scroll bar in said particular direction when a cursor is over the inactive portion of said display region.

2. The graphical user interface ("GUI") of claim 1 wherein the display region has a background field from which each presentation control appears to visually extend, and the program further interacts with the GUI to display the one or more GUI objects as being built into the background field of the display region.

3. A method of providing a graphical user interface ("GUI") in a computer system comprising the steps of:

displaying multiple GUI objects as part of a GUI, in which the GUI objects are grouped into subpanels, and in which the subpanels are grouped into a region of a window of the GUI that displays information in the computer system;

providing each subpanel with a presentation control bearing a name of its associated subpanel, wherein the display region has a background field from which each presentation control appears to visually extend;

expanding a subpanel within said region when the corresponding presentation control of the subpanel is activated and the subpanel is collapsed;

in response to expanding said subpanel within said region, displaying GUI objects that are grouped into said subpanel so that the GUI objects appear to be built into the background field of said display region;

collapsing a subpanel when the corresponding presentation control of the subpanel is activated and the subpanel is expanded and displaying only the presentation control and name when the subpanel is collapsed;

maintaining the region substantially constant in size and free of scrollbars and a position of the presentation control substantially unchanged when expanding and collapsing the subpanels; and scrolling said one or more panels in said display region in a particular direction by dragging an inactive portion of said display region other than a scroll bar in said particular direction when a cursor is over the inactive portion of said display region.

4. The method of claim 3 wherein the presentation control is a button bar that appears to protrude from said background field.

5. A method of displaying three dimensional model parameter values in a computer system, the computer system executing a three dimensional modeling application and including a three dimensional model, the method comprising:

accessing the three dimensional model, the three dimensional model including a master object and a plurality of modifier objects, such that when a display of the three dimensional model is generated, the plurality of modifier objects modify the appearance of the master object;

displaying a command panel for modifying the three dimensional model;

displaying a first user interface object in the command panel, the first user interface object having a first control object and a first set of parameter modification objects, the first set of parameter modification objects for modifying and redisplaying parameters of the master object;

displaying a second user interface object in the command panel, the second user interface object having a second control object and a second set of parameter modification objects, the second set of parameter modification objects for displaying parameters of a first modifier object of the plurality of modifier objects;

wherein each of the first control object and the second control object is in either a collapsed state or an expanded state, and wherein a control object in the expanded state comprises a presentation control bearing a name of the control object and parameter setting objects that modify a set of parameters associated with that user interface object, and wherein a control object in the collapsed state comprises only the presentation control bearing the name of the control object;

maintaining the region substantially constant in size and free of scrollbars and a position of the presentation control substantially unchanged when expanding and collapsing the subpanels; and wherein the first user interface object and the second user interface object are scrollable within the command panel in a particular direction by dragging an inactive portion of said display region other than a scroll bar in said particular direction when a cursor is over the inactive portion of said display region.

6. The method of claim 5 wherein the first user interface object and the second user interface object are a first rollout and a second rollout, respectively.

7. In a graphical user interface (GUI) executed by a computer system and comprising one or more windows, a parameter selection mechanism, comprising:

a rectangular display region within one of the windows and having initial horizontal and vertical dimensions of predetermined size;

one or more expandable and collapsible subpanels vertically aligned within the display region, each subpanel comprising a presentation control that is visible when the subpanel is expanded or collapsed, each subpanel comprising one or more parameter controls that are displayed as part of the display region when the subpanel is expanded, and which are not displayed when the subpanel is collapsed, and which bear a name of their associated subpanel;

wherein said one or more parameter controls for a subpanel is displayed immediately below the presentation control of the subpanel when said subpanel is expanded;

each presentation control having a width substantially equal to the horizontal dimension of the display region, and wherein the dimensions of the display region are unchanged and the display region is free of scrollbars and a position of the presentation control substantially unchanged when all the subpanels are collapsed;

wherein the dimensions of the display region are not affected by the expansion or collapse of said one or more subpanels; and wherein the subpanels are scrollable within the display region in a particular direction by dragging an inactive portion of the display region other than a scroll bar in said particular direction when a cursor is over the inactive portion of said display region.

* * * * *